H. M. TEASDALE.
Cultivator.

No. 48,324

Patented June 20, 1865.

Witnesses:
R. T. Campbell
E. Schafer

Inventor:
H. M. Teasdale

UNITED STATES PATENT OFFICE.

H. M. TEASDALE, OF DANSVILLE, NEW YORK.

IMPROVEMENT IN CULTIVATORS.

Specification forming part of Letters Patent No. 48,324, dated June 20, 1865.

*To all whom it may concern:*

Be it known that I, H. M. TEASDALE, of Dansville, in the county of Livingston and State of New York, have invented a new and Improved Cultivator; and I do hereby declare that the following is a full, clear, and exact description thereof, reference being had to the accompanying drawings, making a part of this specification, in which—

Figure 1:
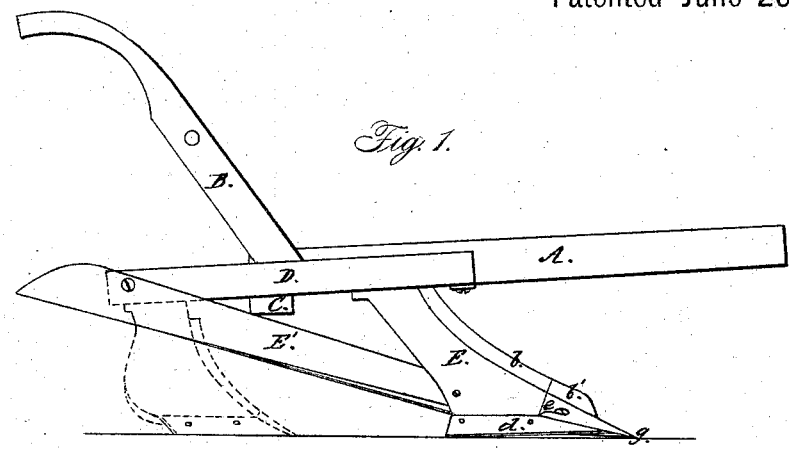
Figure 2:
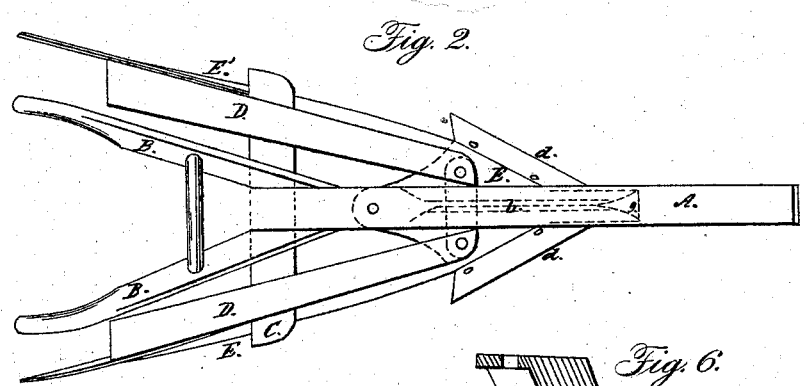
Figure 3:
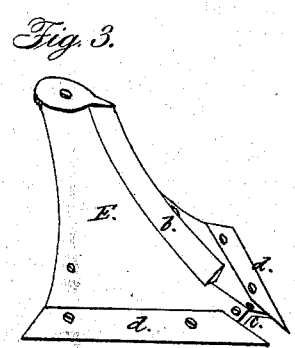
Figure 5:
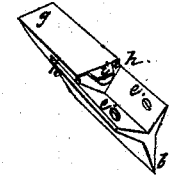
Figure 6:
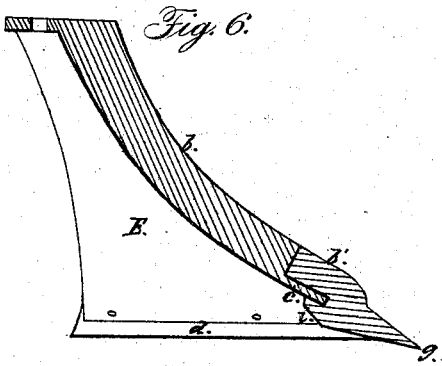
Figure 4:
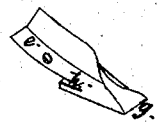
Figure 7:
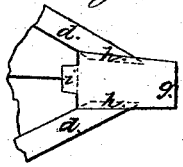

Figure 1 is an elevation of one side of my machine. Fig. 2 is a top view of the machine. Fig. 3 is a perspective view of the double turning-shovel with the point removed. Fig. 4 is the point of the shovel. Fig. 5 is an inverted perspective view of the shovel-point. Fig. 6 is a vertical central section through the shovel with point attached. Fig. 7 is a bottom view, showing the point attached to the forward portion of the shovel.

Similar letters of reference indicate corresponding parts in the several figures.

This invention relates particularly to an implement for the cultivation of corn and other crops which require earthing up and weeding as they increase in size and strength; and it consists in providing a double mold-board plow with wings, which are so arranged in rear of the plow that they will conduct the earth which is loosened and thrown up by the sides of the plow up to and distribute it about the roots of the plants, at the same time serve as scrapers for removing weeds, &c., as will be hereinafter described.

The invention further consists in providing a plow having a colter formed on it and extending from its point to its upper end with a removable point, which is constructed with the lower termination of the colter formed upon it, and also with recesses adapted to receive the forward ends or removable share-blades, so that the portion of the colter which is most rapidly worn out can be renewed by renewing the plow-point, as will be hereinafter described.

To enable others skilled in the art to understand my invention, I will describe its construction and operation.

In the accompanying drawings, A represents the plow-beam, to which the handles B B are secured.

C is a transverse beam extending out from each side of the plow-beam, near its rear end, and serving as a support and lateral brace for two converging beams, D D, which in my machine are used for two purposes, viz: they serve as a means for using two wide shares or shovels, one of which is indicated in red in Fig. 1; but these beams are intended more particularly as rear supports for the extended and inclined wings E' E' of the plow E, which incline forward and are spread wider apart as they are continued from the wings or mold-board of the plow backward. These wings are narrow strips, with their lower edges turned up slightly, so as to conduct the earth which is loosened by the plow E up to and distribute it about the roots of the plants. By giving these wings the inclination represented in the drawings, and spreading their rear end, as described, they will conform to the sides of the hills and be firmly supported laterally by the plow-beams.

The plow E has two mold-boards, which terminate at their forward edge in a cutter or colter, $b$, that extends from the upper end of the plow down to a point which is near the front end thereof, as clearly shown in Figs. 3 and 6, leaving a lip, $c$, as represented. The shares $d\ d$ of the plow are removable blades, which are suitably secured to the mold-boards, and which have their forward ends cut so that the edges thereof will be in lines parallel to each other when the plates are secured in their places.

The plow-point $g$ is constructed with a flat beveled point and a lower termination of the colter $b$, which latter constitutes a point for the colter of the plow when the plow-point is secured in place, as shown in Figs. 1 and 6. This colter-point $b'$ also serves as a strengthening-rib for the point of the plow to prevent this point from easily breaking near its forward extremity, and also to strengthen the connection of the point with the plow. Two inclined flanges, $e\ e$, are formed on the upper portion of the rib $b'$, which are adapted to conform to the double inclined surfaces of the plow and to receive bolts or screws through them for attaching the point to the plow. Just at the heel of the point $g$ is a lip, $i$, which projects under the front edge of the plow-shares, as shown in Figs. 6 and 7, and serves, in conjunction with the screw-fastenings above mentioned, to secure the plow and colter points rigidly to the body of the plow. Two longitudinal grooves, $h\ h$, are formed in the sides of the plow-point $g$ for the purpose of receiving the ends of the share-blades $d\ d$, and thus leaving smooth surfaces at the junction of said blades and plow-point.

By the second part of my invention I provide for renewing the point of the colter $b$, when one point has worn dull, at the same time I renew the plow-point. By making such provision a plow of this description will be strong enough to answer for light plowing wherever a double mold-board plow is found useful. It will run easier than the common double mold-board plow, as the colter will clear the front edge and assist in opening the ground, and this colter can be kept in good working order by simply renewing the point, which can be done at a very small cost.

Having thus described my invention, what I claim as new, and desire to secure by Letters Patent, is—

1. The arrangement of the inclined wings $E'$ $E'$ with the double plow E and the beams D D, in the manner and for the purpose described.

2. The construction of the point represented in Figs. 4 and 5, in combination with the parts E $b\ d$, substantially as and for the purpose herein described.

H. M. TEASDALE.

Witnesses:
S. W. SMITH,
L. B. PROCTOR.